US005958283A

United States Patent [19]

Schmid et al.

[11] Patent Number: 5,958,283

[45] Date of Patent: Sep. 28, 1999

[54] THERMOPLASTICALLY PROCESSIBLE MOLDING MATERIAL

[75] Inventors: Eduard Schmid, Bonaduz; Ivano Laudonia, Thusis; David Jarvis, Domat/Ems; Etienne Aepli, Speicherschwendi; Gion Antoni Tuor, Rhäzüns, all of Switzerland

[73] Assignee: EMS-Inventa AG, Zürich, Switzerland

[21] Appl. No.: 08/991,987

[22] Filed: Dec. 17, 1997

[30] Foreign Application Priority Data

Dec. 19, 1996 [DE] Germany ........................... 196 53 178

[51] Int. Cl.[6] ........................................ C08K 5/092

[52] U.S. Cl. ....................... 252/62.54; 264/429; 524/431; 524/435; 524/440; 524/785

[58] Field of Search ............................. 252/62.54, 62.55; 524/431, 435, 440, 785; 264/429

[56] References Cited

U.S. PATENT DOCUMENTS

| | | | |
|---|---|---|---|
| 4,462,919 | 7/1984 | Saito et al. | 252/62.54 |
| 4,626,371 | 12/1986 | Ikenaga et al. | 252/62.55 |

FOREIGN PATENT DOCUMENTS

| | | |
|---|---|---|
| 2736642 | 2/1979 | Germany . |
| 4420318 | 12/1995 | Germany . |

OTHER PUBLICATIONS

Abstract for JP 4–257203, Sep. 11, 1991.

Abstract for JP 3–270201, Dec. 2, 1991.

Japanese Abstract, JP 04 257 203, Sep. 11, 1992.

Japanese Abstract, JP 03 270 201, Dec. 2, 1991.

*Primary Examiner*—C. Melissa Koslow
*Attorney, Agent, or Firm*—Browdy and Neimark

[57] ABSTRACT

The invention relates to a thermoplastically processible molding material with a two-phase matrix of a partially aromatic copolyamide and an aliphatic polyamide or copolyamide containing permanently magnetic or magnetizable fillers, as well as to a method for producing this molding material and using it for producing molded parts.

24 Claims, No Drawings

THERMOPLASTICALLY PROCESSIBLE MOLDING MATERIAL

FIELD OF THE INVENTION

The invention relates to a thermoplastically processible molding material for magnetic materials, in particular to a molding material of thermoplastic polyamides and a filler which is homogeneously distributed therein and which is permanently magnetic or magnetizable.

BACKGROUND OF THE INVENTION

Thermoplastically processible molding materials with a high volume portion of magnetizable or permanently magnetic filler and a thermoplastic matrix are known.

Important fillers in this connection are rare earth metal compounds, such as Nd/Fe/B in polyamides, such as nylon-6, -11 and -12, or in polyphenylene sulfide or also in polybutylene terephthalate, as the matrix.

To attain satisfactory magnetic values, a volume portion of magnetic or respectively magnetizable filler of more than 30%, in particular of 50% or more, is necessary. This causes considerable problems in practical use, so that many solution attempts are proposed in the patent literature.

For technical areas of use, for example in the engine compartment of vehicles, the matrix properties are also of great importance.

In this connection, matrix materials with a satisfactory temperature resistance and methods for the sufficient mixture with the magnetic filler are particularly sought. Such methods are elaborate and expensive and take the environment only insufficiently into consideration.

With Nd/Fe/B compounds in particular, the so-called neodymium types, the problem of corrosion is added. The metallic neodymium particles corrode under the influence of moisture and/or oxygen. This reaction can even take place spontaneously and can lead to spontaneous combustion.

Therefore many methods are mentioned, in particular in the patent literature,

- for delaying or respectively preventing the corrosion of neodymium particles, in particular by means of a protective coat,
- to modify the matrix by means of special additives, such as ester compounds or amide compounds of fatty acids to make it flowable and wetting-active,
- to bring the matrix into a form which allows a high degree of filling, for example fine grinding of the matrix or dissolving the matrix and coating the magnetic particles, with subsequent evaporation of the solvent, in order to make a matrix available which has special properties, for example satisfactory resistance to chemicals.

For example, Japanese Patent Publication JP 04 257203-A contains magnetizable neodymium particles, specially coated and provided with a bonding agent, in a PA-12 matrix containing magnesium stearate as the internal lubricant.

Japanese Patent Publication JP 03 270201-A describes a magnetic powder, such as Ba and Sr ferrite, in a linear polyamide, such as nylon-6, -66, 610, -11 and -12 as the matrix, which also contain bis-hydroxycarboxylic acid amides for improving processibility.

U.S. Pat. No. 4,462,919 describes the application of a coating on ferromagnetic samarium/cobalt, which is subsequently worked into a thermoplastic material, such as polyamide-12.

German Published Patent Application DE-OS 27 36 642 describes the addition of a thermoplastic material to oxidation-sensitive magnetic material as a solution under a protective gas.

Compositions are described in German Patent Publication DE 44 20 318 C2, which contain partially aromatic thermoplastic materials of the polyester and polyamide type and permanently magnetic and/or ferro-magnetic, metal-containing compounds.

With one exception, the thermoplastic compounds are polyester, in particular polybutylene terephthalate, which is present in pure form or as a polymeric alloy. A polymer identified as polyterephthalic acid hexamethylene diamide is used in Example 3 and described as having a melting point of 236° C. However, the low melting point indicates that this must be a greatly modified product, because all customary partially aromatic polyamides (polyaramides) melt at a temperature of approximately 300° C. and above. So a partially aromatic polyamide in accordance with the teaching of this patent can for example examplary be used, if it is present in a modified form such that its melting point, as described in the application example 3 as being 236° C., has been substantially lowered.

As already explained and confirmed by DE 44 20 318 C2, the high-quality aromatic or respectively partially aromatic thermoplastic materials can only be used as a matrix for magnetic materials by means of processes which are expensive or of low environmental friendliness, such as fine grinding or application as a solution.

It is particularly difficult to produce thermoplastically processible magnetic materials with a high level of filling, in particular of more than 50 vol %, of magnetic or magnetizable metal compounds, in a matrix of partially aromatic polyamide with a melting point of more than 300° C., and to process them.

Therefore thermoplastically processible magnetic materials are required, which have a matrix of dimensionally stable, hydrolysis- and chemically-resistant polyamide of high rigidity and a high melting point, which is filled to a high volume fraction, in particular of more than 50%, with a magnetic or magnetizable metal alloy and/or, which can be easily processed by means of injection molding and results in dimensionally stable magnetic or magnetizable molded parts.

Furthermore polymer based, thermoplastically formed parts of magnetic materials are required, preferably produced by injection molding, for special applications, for example electric motors, for use in automobiles or electronic entertainment devices, in particular if the continuous use temperature lies at 100° C. or above, and temperature peaks of 200° C. are temporarily attained.

OBJECT AND SUMMARY OF THE INVENTION

It is the object of the instant invention to meet these requirements and to overcome the disadvantages of the prior art.

The object is attained in particular by a molding material which consists of a two-phase blend a) of at least one partially aromatic copolyamide and at least one aliphatic polyamide or copolyamide as the matrix, which contains at least one permanently magnetic or magnetizable compound b) as the filler in homogeneous distribution.

Matrices made of a1) 70 to 99 weight-% of a partially aromatic copolyamide with a melting point of more than 280° C., and a2) 1 to 30 weight-% of an aliphatic polyamide or copolyamide with a statistical mean value of at least 10 —$CH_2$— groups per —CONH— group, and a3) 0 to 10 weight-% of property-relevant and/or process-conditional additives, wherein the sum of the matrix components a1) to a3) is 100% by weight, are preferred for this, in particular if their polyamide chain ends have an excess of amino end groups, e.g. $NH_2$ groups and/or NHR' groups wherein R' is an alkyl radical or cyclohexyl radical, or the amino group is a component of a cyclo-aliphatic radical.

Since the polyamides a1) usually are in an end group equilibrium, the $NH_2$ end group excess in the matrix can be achieved by the aliphatic polyamide a2) alone. The two polyamides a1) and a2) constitute two phases in the mixture.

In particularly preferred variants, the matrix consists of 80 to 97 weight-% of partially aromatic copolyamide a1) and 3 to 20 weight-% of aliphatic polyamide or copolyamide a2).

The partially aromatic copolyamides of the molding material in accordance with the invention are distinguished in that a high proportion of the dicarboxylic acid component consists of aromatic acids, in particular terephthalic acid, but also isophthalic acid or naphthalene dicarboxylic acid.

Besides this, a proportion of less the 50 mol-%, in relation to the entire acid portion, of aliphatic dicarboxylic acids is advantageous, adipic acid being preferred. The amine component is preferably aliphatic, wherein hexamethylene diamine is the preferred diamine. Caprolactam is also often employed as a comonomer.

Since partially aromatic polyamides, which are capable of crystallizing and whose amine component is hexamethylene diamine and whose acid component is exclusively an aromatic dicarboxylic acid, such as terephthalic acid, have melting points clearly above 300° C. and have extraordinarily high melt viscosities, comonomers are inevitably used in order to purposefully change the properties, in particular to lower the melting point and to make thermoplastic processing possible. Currently available partially aromatic polyamides are, for example, the Ultramid® T types of the BASF company, Ludwigshafen (Germany), the Amodel® types of the Amoco company, Chicago, Ill. (USA), the Zytel® HTN polyamides of the du Pont company, Wilmington, Del. (USA), the Arlen® products of Mitsui Sekka, Tokyo (Japan), as well as the Grivory® HT polyamides of EMS—CHEMIE AG, Domat/Ems (Switzerland).

Partially aromatic copolyamides a1) in the sense of the invention are partially crystalline products with a melting point which lies above 280° C., preferably above 300° C., and particularly preferred in the range of 310 to 320° C. The designation polyaramides is a generic term for this class of polyamides.

A preferred copolyamide, which is well suited to technical applications and will be identified hereinafter as "polyamide T", consists of 55 mol-% of hexamethyleneterephthalamide units and 45 mol-% of hexamethyleneadipamide units and melts at 310 to 315° C.

Aliphatic polyamides a2) in the sense of the invention are, for example, polyamide 11 and 12, the polyamides 1012, 1210 and 1212. Copolyamides a2) are those, for example, which also contain dimerized fatty acids with 36 to 44 C atoms and have a melting point above 170° C. In this case it is advantageous for these aliphatic polyamides or copolyamides to contain more $NH_2$ end groups than COOH end groups. Particularly preferred are aliphatic polyamides and copolyamides of high melt flow which, for example, have 50–200 $\mu$eq./g of amino end groups and 2 to 30 $\mu$eq./g of carboxylic end groups.

The molding material in accordance with the invention contains at least 30 percent by volume of a permanently magnetic or respectively magnetizable metal compound and/or alloy as the homogeneously distributed filler b).

In preferred product variants, this filler proportion is at least 45 percent by volume, and particularly preferred even at least 55 percent by volume of the entire molding material.

Metals or alloys, in particular rare earth metal powders (including yttrium) of the type of rear earth metal/iron/boron, are preferred as fillers, wherein Nd/Fe/B, also called "neodymium", is particularly preferred. Also advantageous are the alloys, known for magnetic materials, of samarium/cobalt and samarium/thulium, ferrites, such as barium and strontium ferrite, as well as carbonyl iron powders. Suitable metal powders are described, for example, in the company prospectus DR 9632 MAG of the Delco Remy company, Anderson, Ind. 46013, USA, and are identified as Magnequench® products.

Nd/Fe/B, SmTm, for example $Sm_2Tm_{17}$, SmCo, for example $SmCo_5$, are high-quality magnetic products in particular. However, basically all magnetic and/or magnetizable metal powders and metal compounds are possible. In this case it is advantageous, but not required, that they be coated. Suitable coatings for ferrites are part of the prior art.

The matrix of the molding material in accordance with the invention advantageously additionally contains up to 10 percent by weight of process- and/or property-relevant additives a3) in order to widen their range of use.

These are stabilizers in particular, for example heat stabilizers, such as sterically hindered phenols, sulfide derivatives or aromatic amines. Examples thereof are Irganox® 1098, Irganox® 1076, Irganox® 245 or Irganox® 1010 as phenol derivatives and Irganox® PS800 as sulfide derivative. The manufacturer of these products is Ciba-Geigy, Basel, Switzerland. An example of a suitable aromatic amine is Naugard® 445 of the Uniroyal company of Herstal, Belgium.

Further advantageous additives are processing aids, such as metal stearate, partial glycerol esters, fatty acid esters and fatty acid amides and, in particular, alkylamines which have a primary amino group and/or those of the formula I, $$R\text{—}(HN\text{—}CH_2CH_2CH_2)_n\text{—}NH_2 \qquad (I)$$

in which n=1 to 3 and R is a C12 to C44 alkyl radical which can also contain hetero-atoms. They are preferably contained in proportions of 0.1 to 7 weight-% in relation to the weight of the matrix.

Examples of such processing aids which in particular improve the processibility in connection with injection molding are for example, calcium stearate, magnesium stearate, ethylene bis-stearamide, stearyl stearate, glycerol monostearate and in particular amines, such as N-hexadecyl amine, and diamines wherein an amino function is secondary. Examples of such diamines which are derived from the appropriate natural products and are trademarked under the name Duomeen® of the AKZO company are N-coco-1,3-diaminopropane with the coco radical ($C_8$ to $C_{18}$ with 50% $C_{12}$) and N-talcum-1,3-diaminopropane with the talcum radical (mainly $C_{18}$).

Furthermore, all non-oxidizingly acting additives such as are used for thermoplastically processible polyamide molding materials, can also be used, for example waxes, light stabilizers and oxidation-protection agents, such as phosphites. This list can be arbitrarily increased in accordance with the prior art.

The corrosion-protecting effects of the amine-containing melt of the molding material in accordance with the invention relative to the metal compounds and alloys are of particular advantage.

The manufacture of the molding material in accordance with the invention is particularly advantageous and simple. No special and elaborate preparation steps or solvents are needed.

The process can be executed in a simple manner in a device suitable for the production of polyamide molding materials, for example a double-screw extruder, in particular a ZSK machine of the firm Werner and Pfleiderer of Stuttgart, Germany, for example, directly from a mixture of the matrix components and by working in the metal powder into the molten matrix components.

A preferred method variant consists in that initially the polyamide components of the matrix are meltmixed with the additives under an inert gas atmosphere and subsequently the filler is added to this melt and is also homogeneously distributed in it. After leaving the extruder, the material is cooled, comminuted and dried. Following this it can be further processed thermoplastically in accordance with any method. Preferred is the production of injection molded parts The production steps are generally performed continuously under a protective gas.

A preferred variant consists in performing the method as a whole continuously, in one machine, e.g. in a double screw extruder.

Another preferred variant consists in producing the matrix in a first step, and to remelt the granules and continuously fill the matrix later in a second machine or during a second passage through the extruder. With this second preferred variant, the method steps, viewed separately, are also performed continuously, but, when considering the entire process, are separated. The advantage of the second variant lies in that it is possible when using a standard matrix to react more flexibly during the production to different requests regarding type and amount of the filler material. In this case the melt is advantageously maintained under a protective gas (inert gas) atmosphere.

A particularly preferred method variant is the production of the molding material by means of mixing the polyamide components and the additives in the molten state by means of a continuously operating double-screw extruder, for example of the type ZSK of the firm Werner and Pfleiderer, and working in the metal powders in a second extrusion passage, each time while under an inert gas atmosphere.

The high degree of wettability of the amine-containing melt of the matrix in accordance with the invention relative to metal alloys is of particularly great advantage when executing the method in accordance with the invention.

A further great advantage, besides the simplicity, is the environmental friendliness of the solvent-free method.

The invention also includes the use of the thermoplastically processible molding material in accordance with the invention to produce permanent magnetic or magnetizable molded parts by thermoplastic processes.

In addition, it is a further quite important advantage that the molding material in accordance with the invention cannot only be thermoplastically further processed in a simple manner, but that it and the molded parts made from it can withstand particularly high, and in particular thermal exposure, for example continuous action of heat at temperatures above 100° C. Their short-time range of use can even surpass 200° C., since HDT A values of more than 200° C. can be reached.

Molded magnetic parts can be produced in a simple manner from the molding material in accordance with the invention. An injection molding method is advantageously employed for high-precision parts of excellent magnetic and mechanical properties.

Preferred applications are, for example, rotors and stators of electric motors.

The molded parts in accordance with the invention are preferably magnetized as finished parts. However, magnetization is alternatively also possible by means of known prior art methods during the molding operation.

The molded parts are rigid, dimensionally stable, excellently resistant to temperature and chemicals, in particular to greases, oils, cleaning solvents and neutral and alkaline media. They are corrosion-resistent under the influence of oxygen and moisture.

DETAILED DESCRIPTION

Examples

The production of the molding materials by use of a double-screw extruder was performed in a nitrogen atmosphere as the inert gas.

Examples 1 to 8

Partially aromatic polyamide T, consisting of 55 mol-% of hexamethyleneterephthalamide units and 45 mol-% of hexamethyleneadipamide units with a melting point of 310 to 315° C. (DSC peak) was compounded in the known manner in a double-screw extruder of the type ZSK 30 from the firm Werner and Pfleiderer of Stuttgart, Germany, with different aliphatic polyamides, processing aids and heat stabilizers. The recipes and the process parameters are compiled in Table 1.

The compounds examined in the DSC show that the melting point of polyamide T is reduced by the addition of PA6 and PA66, whose own melting band no longer appears. Therefore these compounds are true alloys of their components with reduced suitability as a matrix, since their form stability under heat, for example the Heat Distortion Temperature, in particular has been reduced.

In contrast thereto the compounds of polyamide T and aliphatic polyamides with ten or more $CH_2$ groups per —CONH—group are stable 2-phase systems, which even after repeated melting with increasing up to 330° C. temperature are still maintained two-phased. The DSC melting points in Table 1, measured during several melting cycles, prove this impressively.

For example, in Examples 3 to 8 the melting band of polyamide T is hardly changed even by the third melting, and the melting band of the aliphatic polyamides with ten or more $CH_2$ groups per —CONH-group are preserved and their respective maxima are hardly changed.

TABLE 1

| Example | 1(6) | 2(6) | 3 | 4 | 5 | 6 | 7 | 8 |
|---|---|---|---|---|---|---|---|---|
| Composition in Parts by Weight | | | | | | | | |
| PA T | 84 | 84 | 84 | 84 | 84 | 84 | 90 | 90 |
| PA 6 | 16 | | | | | | | |
| PA 66 | | 16 | | | | | | |
| PA 12 (C) | | | 16 | | | | 10 | |
| PA 12 (N) | | | | 16 | | | | 10 |

TABLE 1-continued

| Example | 1[(6)] | 2[(6)] | 3 | 4 | 5 | 6 | 7 | 8 |
|---|---|---|---|---|---|---|---|---|
| PA 1212 (C) | | | | | 16 | | | |
| PA 11 (N) | | | | | | 16 | | |
| Glycerol monostearate | 1 | 1 | 1 | | 1 | | | |
| Fatty amine C16/18[(1)] | | | | 1 | | 1 | | 1 |
| Calcium stearate | | | | | | | 1 | |
| Irganox ® 245 | 0.5 | 0.5 | | | | | | |
| DSC[(2)] (° C.) PA T[(3)] | | | | | | | | |
| 1st Cycle | 307 | 311 | 304 | 306 | 310 | 308 | 313 | 312 |
| 2nd Cycle | 299 | 300 | 312 | 313 | 312 | 307 | 308 | 308 |
| 3rd Cycle | | | 312 | 309 | 308 | 307 | 309 | 309 |
| DSC[(2)] (° C.) PA aliph.[(4)] | | | | | | | | |
| 1st Cycle | [(5)] | [(5)] | 176 | 176 | 181 | 188 | 176 | 172 |
| 2nd Cycle | | | 178 | 179 | 181 | 187 | 175 | 173 |
| 3rd Cycle | | | 176 | 177 | 177 | 186 | 175 | 173 |

[(1)]Fatty amine with 16/18 C-atoms (Armeen ® HTD; AKZO CHEMIE, Amersfort, Netherlands)
[(2)]DSC measurement of respectively 10 mg of the polyamide with a heating rate of 20° C./min to 330° C.; with repeated measurements, rapid cooling inbetween and reheating to 330° C. (at 20° C./min);
[(3)]Polyamide T;
[(4)]PA aliph. = aliphatic polyamide;
[(5)]No melting band detectable;
[(6)]Comparison example.

For testing the surprising stability of the two-phase polyamide matrix and its behavior, in Examples 7 and 8 each a reduced proportion of 10 weight-% of highly melt flowable PA-12 with COOH or respectively $NH_2$ end groups was compounded with polyamide T at an increased melt temperature of 320° C. and increased residence time in the extruder. Even under these more severe production conditions the melting bands of polyamide T and the reduced proportion of PA-12 are present practically unchanged even after the third melting cycle.

Examples 9 and 10

Matrix components, also containing (analogously with Example 4) amine-terminated PA-12 with high melt flow, amine and heat stabilizer, were produced on the basis of partially crystalline partially aromatic polyamide T under the same conditions and using the same extruder as in Examples 1 to 8.

For comparison measurement, respectively pure polyamide T and the blends of examples 9 and 10 were melted in an injection molding machine and were injected at a melt temperature of 328° C. under the identical machine settings into an injection molding die, embodied as a long spiral in one plane and maintained at 140° C. In the process the melt could flow, depending on its viscosity, for different distances until it solidified. The flow path length achieved could be measured directly on the solidified spiral-shaped injection-molded part. This flow path length is a measure for the processibility of the molding material into complicated parts.

The recipe and results are represented in Table 2 (below).

TABLE 2

| Composition (weight-%) | Example 9 | Example 10 |
|---|---|---|
| Polyamide T | 90 | 93 |
| Polyamide 12[1)] | 8 | 4 |
| Fatty amine C16–C18 | 1 | |
| Amine: $R—NH(CH_2)_3NH_2$[2)] | | 2 |
| Irganox ® 245 | 1 | 1 |

TABLE 2-continued

| Composition (weight-%) | Example 9 | Example 10 |
|---|---|---|
| DSC | [3)] | [3)] |
| Length of flow path (flow spiral) mm | 400[4)] | 614[4)] |

[1)]$NH_2$ end groups: 110 μeq./g, COOH end groups: 5 μeq./g.
[2)]Diamine with R = C8–C16; Duomeen ® C, AKZO-CHEMIE
[3)]Two melting bands clearly visible by DSC, for polyamide T at approximately 310° C. and for PA-12 at approximately 176° C.
[4)]For comparison: Pure polyamide T had a flow path length of 346 mm.

Examples 11 and 12

Matrix materials in accordance with tests 9 and 10 were produced on a double-screw extruder at material temperatures of 320 to 330° C., and their melt flow rate was determined by means of MFR measurements (in accordance with DIN ISO 1133 on a measuring device type MP-D of the firm Gottfert with a nozzle of 0.8 cm length and 0.21 cm diameter), as well as the density, furthermore the notched impact strength and the tensile properties, by means of test bodies produced by injection molding. The compositions and results are represented in Table 3 (on the following page).

TABLE 3

| | | Example 11 | Example 12 |
|---|---|---|---|
| Composition | Proportions | | |
| Polyamide T | Weight-% | 90 | 82 |
| Armeen ® HTD Fatty amine C16–C18 | Weight-% | 1 | 1 |
| Polyamide 12 | Weight-% | 8 | 16 |
| Irganox ® 245 | Weight-% | 1 | 1 |
| Analysis: | Unit | | |
| DSC | ° C. | 176/308 | 176/307 |
| rel. vis. (0.5% in m-cresol) | — | 1.615 | 1.602 |
| MFR (320° C./5 kg) | g/10 Min. | 164.1 | 284.6 |
| Density | $g/cm^3$ | 1.168 | 1.152 |
| Material testing: | Unit | | |
| notched impact strength acc. | $kJ/m^2$ | 2.5 | 3.4 |

TABLE 3-continued

| | | Example 11 | Example 12 |
|---|---|---|---|
| to Charpy, 23° C. | | | |
| tensile E-Modulus dry | N/mm$^2$ | 3661 | 3566 |
| tensile E-Modulus cond. | N/mm$^2$ | 3612 | 3363 |
| tensile strength at break dry | N/mm$^2$ | 54.7 | 48.6 |
| tensile strength at break cond. | N/mm$^2$ | 61.1 | 57.6 |
| Elongation at break dry | % | 1.6 | 1.4 |
| Elongation at break cond. | % | 1.8 | 1.8 |
| HDT B dry | ° C. | 237 | 220 |
| HDT B cond. | ° C. | 221 | 208 |

It was shown that by increasing the weight proportion of polyamide 12 (PA-12 analogously to Example 4) it was possible to increase the melt flow and notched impact strength, while the remaining mechanical properties hardly changed.

Example 13

Neodymium powder of the type Magnequench® MQP.B of the firm Delco Remy of Anderson, Ind., USA, was worked into a not previously extruded matrix mixture of the components in accordance with Examples 11 and 12 on a double-screw extruder with the screws rotating in the same direction, type KF 540, of the firm Berstorff of Hannover, Germany, with a screw diameter of 32 mm.

Compositions and machine parameters are contained in Table 4.

TABLE 4

| Composition | Weight-% |
|---|---|
| Polyamide T | 15.60 |
| Polyamide 12 | 0.20 |
| Amine C16–C18 | 0.05 |
| Irganox ® B 1171 | 0.10 |
| Magnequench ® MQP.B | 84.00 |
| Conditions | |
| Nitrogen blanket | + |
| screw speed [RPM] | 100 |
| Processing temperature [° C.] | 280–310 |
| Temp. Nozzle, Target [° C.] | 310 |
| Metering | Matrix Components and Metal Powder, separate |
| Throughput [kg/h] | 60 |

Examples 14 to 17

Magnequench® MQP.B powder was worked into a matrix in accordance with Example 12 in the extruder analogously with Example 13 while increasing the concentration in steps to 83, 87, 88 respectively 89 weight-%. The process was performed similar to Example 13, but in addition the temperature of the melt and the nozzle was raised to 325° C. with increasing degree of filling. Working the Magnequench® MQP.B powder into the prepared matrix was easily possible. The upper addition limit of the Magnequench® MQP.B powder was 89 weight-% under the conditions in these examples.

The composition of the molding material can be taken from Table 5 and its properties from Table 6.

TABLE 5

| Composition, Example | 14 | 15 | 16 | 17 |
|---|---|---|---|---|
| Matrix in acc. w/Ex. 12; (Weight-%) | 17 | 13 | 12 | 11 |
| Magnequench ® MQP.B; (Weight-%) | 83 | 87 | 88 | 89 |

TABLE 6

| Example | 14 | 15 | 16 | 17 |
|---|---|---|---|---|
| Density [g/cm$^3$] | 3.95 | 4.38 | 4.51 | 4.68 |
| Tensile E-Modulus [N/mm$^2$] | 14500 | 17700 | 19000 | 20000 |
| Tensile strength at break [N/mm$^2$] | 100 | 95 | 95 | 95 |
| Elongation at break [%] | 1.4 | 0.9 | 0.8 | 0.7 |
| Impact strength [kJ/m$^2$] | 13 | 14 | 12 | 12 |
| Notched impact strength acc. to Charpy, 23° C. [kJ/m$^2$] | 3 | 3 | 3 | 3 |
| HDT.A [° C.] | 180 | 200 | 210 | 220 |
| Remanence [T] | 0.37 | 0.43 | 0.46 | 0.49 |
| Energy product [kJ/m$^3$] | 25 | 31 | 35 | 41 |

The mechanical properties were determined in the dry state.

Example 18

A thermoplastically processible molding material with the composition in accordance with Table 7 was produced by means of the same extruder as in Example 13.

TABLE 7

| Composition | Weight-% |
|---|---|
| Polyamide T | 10.66 |
| Polyamide 12* | 2.08 |
| Glycerol monostearate | 0.13 |
| Irganox ® 245 | 0.13 |
| Magnequench ® MQP.B | 87 |

*PA-12, at high melt flow with COOH chain ends.

The resultant product was additionally used in Example 20, the salt fog test.

Example 19

Granulate from Example 13 was injection molded at a melt temperature of 320° C. and a mold temperature of 140° C. into bars of the size of 80×10×4 mm. The stalks were regranulated and admixed to the base granulate at 10 and 30 weight-%, and this mixture was again injection molded into bars. Additionally the bars were completely comminuted and re-injection molded once, twice and three times into bars of the mentioned size.

Measurements of the remanence and of the energy product did not reveal any reduction of the magnetic values. The tenacity also was only insignificantly changed. It only drops from 3.2 to 2.7 kJ/m$^2$ for material completely granulated three times.

A slight reduction of the values can be noted only in the modulus and the tensile strength in the second complete regranulation, because the metal particles are comminuted during the repeated remolding of the molding material and small plates of less diameter are formed. The modulus as a whole drops from 19000 to 16600 N/mm$^2$, and the tensile strength from 97 to 70 N/mm$^2$.

Example 20

Stability in a salt fog test

Tensile test rods of 4 mm thickness, ISO 527, Type 2, were subjected to a salt fog test as described in pre-standard DIN 50021 for eight hours, and the rods were then visually checked for the appearance of corrosion.

The results are compiled in Table 8.

TABLE 8

| Molding Material (acc. To test) | Evaluation, Formation of Rust |
|---|---|
| No. 13 | Partially slight rust coloration |
| No. 15 | Partially slight rust coloration |
| No. 18 | Red coloration |

The formation of rust along with red coloration increases with increased treatment in the salt fog. Up to a treatment of 48 h (end of test), it is less with the formulations in accordance with Example 13 and Example 15 than with a molding material in accordance with Example 18.

This is a substantiating proof that the thermoplastically processible magnetic materials in accordance with the invention also resist environmental expositions to an increased extent when amino end group-containing, linear polyamide and amine compounds, which are moreover excellent processing aids, are used.

What is claimed is:

1. A thermoplastically processible molding material, consisting of a two-phase matrix a) of a1) 70 to 99 weight-% of a partially aromatic copolyamide containing an aliphatic dicarboxylic acid component, said aliphatic dicarboxylic acid component being present in a proportion of less than 50 mol-% of the entire acid components, said partially aromatic copolyamide having a melting point of more than 280° C., a2) 1 to 30 weight-% of an aliphatic polyamide or copolyamide with a statistical mean value of at least 10 —$CH_2$groups per —CONH— group, and a3) 0 to 10 weight-% of property-relevant and/or process-conditional additives, wherein the sum of the matrix components a1) to a3) is 100 weight-%, and b) in relation to the total volume of the molding material, at least 30 vol.-% of a permanently magnetic or magnetizable metal compound and/or metal allow incorporated into the matrix as a filler with a homogeneous distribution to the matrix.

2. The molding material in accordance with claim 1, characterized in that the matrix a) consists of 80 to 97 weight-% of a partially aromatic copolyamide a1) and 20 to 3 weight-% of an aliphatic polyamide or copolyamide a2).

3. The molding material in accordance with claim 1, characterized in that the partially aromatic copolyamide a1) has a melting point of at least 300° C.

4. The molding material in accordance with claim 1, characterized in that the aliphatic copolyamide a2) contains dimerized fatty acid with 36 to 44 C atoms as co-components.

5. The molding material in accordance with claim 1, characterized in that the aliphatic polyamide or copolyamide a2) has an excess of amino end groups.

6. The molding material in accordance with claim 5, characterized in that the aliphatic polyamide or copolyamide a2) has amino end groups of the type —$NH_2$ and/or NHR', wherein R' is an alkyl radical or cyclohexyl radical, or the amino group is a component of a cyclo-aliphatic radical.

7. The molding material in accordance with claim 5, characterized in that aliphatic polyamide or copolyamide a2) has 50 to 200 $\mu$eq/g of amino end groups.

8. The molding material in accordance with claim 5, characterized in that the additive a3) is at least one alkylamine.

9. The molding material in accordance with claim 8, characterized in that the alkylamine a3) is an amine of the formula 1, wherein n is 1 to 3 and R is an alkyl radical with 12 to 44 C atoms, optionally substituted with hetero-atoms:

$$R—(HN—CH_2CH_2CH_2)_n—NH_2 \quad (I).$$

10. The molding material in accordance with claim 5, characterized in that the metal compound or the metal alloy b) is provided in a volume portion of at least 45%.

11. The molding material in accordance with claim 5, characterized in that the metal compound or the metal alloy b) is provided in a volume portion of at least 55%.

12. The molding material according to claim 5, wherein the metal compound or metal alloy is provided in an amount by weight of 83–89%.

13. The molding material of claim 1, wherein said aliphatic dicarboxylic acid comprises adipic acid.

14. A thermoplastically processible molding material, consisting of a two-phase matrix a) of a1) a copolyamide which consists of 55 mol-% of hexamethyleneterephthalamide units and 45 mol-% of hexamethyleneadipamide units, having a melting point of more than 280° C., a2) 1 to 30 weight-% of an aliphatic polyamide or copolyamide with a statistical mean value of at least 10 —$CH_2$, groups per —CONH— group, and a3) 0 to 10 weight-% of Property-relevant and/or process-conditional additives, wherein the sum of the matrix components a1) to a3) is 100 weight-%, and b) in relation to the total volume of the molding material, at least 30 vol.-% of a permanently magnetic or magnetizable metal compound and/or metal alloy incorporated into the matrix as a filler with a homogeneous distribution to the matrix.

15. The molding material in accordance with claim 14, wherein the aliphatic copolyamide a2) contains dimerized fatty acid with 36 to 44 C atoms as co-components.

16. The molding material in accordance with claim 14, wherein the aliphatic polyamide or copolyamide a2) has an excess of amino end groups.

17. The molding material in accordance with claim 14, wherein the aliphatic polyamide or copolyamide a2) has amino end groups of the type —NH2 and/or NHR', wherein R' is an alkyl radical or cyclohexyl radical, or the amino group is a component of a cyclo-aliphatic radical.

18. The molding material in accordance with claim 14, wherein the aliphatic polyamide or copolyamide a2) has 50 50 200 $\mu$eq./g of amino end groups.

19. The molding material in accordance with claim 14, wherein the additive a3) is at least one alkylamine.

20. The molding material in accordance with claim 14, wherein the alkylamine a3) is an amine of the formula I, wherein n is 1 to 3 and R is an alkyl radical with 12 to 44 C atoms, optionally substituted with hetero-atoms:

$$R—(HN—CH_2CH_2CH_2)_n—NH_2 \quad (I).$$

21. The molding material in accordance with claim 14, wherein the metal compound or the metal alloy b) is provided in a volume portion of at least 45%.

22. The molding material in accordance with claim 14, wherein that the metal compound or the metal alloy b) is provided in a volume portion of at least 55%.

23. A method for producing a thermoplastically processible molding material consisting of a two-phase matrix a) of a1) 70 to 99 weight-% of a partially aromatic copolyamide containing dicarboxylic acid components with a proportion of aliphatic dicarboxylic acid of less than 50 mol-% of the entire acid components and a melting point of more than 280° C., a2) 1 to 30 weight-% of an aliphatic polyamide or copolyamide with a statistical mean value of at least 10 —$CH_2$-groups per —CONH— group, and a3) 0 to 10 weight-% of property-relevant and/or process-conditional additives, wherein the sum of the matrix components a1) to a3) is 100 weight-%, and b) in relation to the total volume of the molding material, at least 30 vol.-% of a permanently magnetic or magnetizable metal compound and/or metal alloy incorporated into the matrix as a filler with a homogeneous distribution to the matrix, said method comprising:

melting and homogeneously mixing the matrix components a1) and a2) including the additives a3) under the protection of an inert gas, subsequently adding and homogeneously admixing the metal compound or metal alloy therewith to provide a molten mixture, and extruding said molten mixture, cooling, comminuting and drying.

24. The method in accordance with claim 23, wherein said metal compounds or metal alloys are coated.

* * * * *